W. H. HALL.
Corn-Sheller.
No. 203,032.          Patented April 30, 1878.
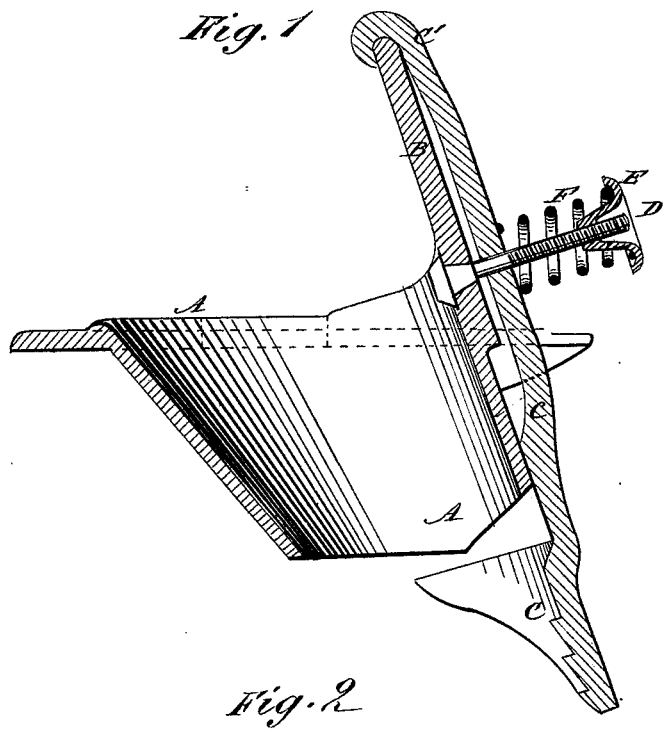
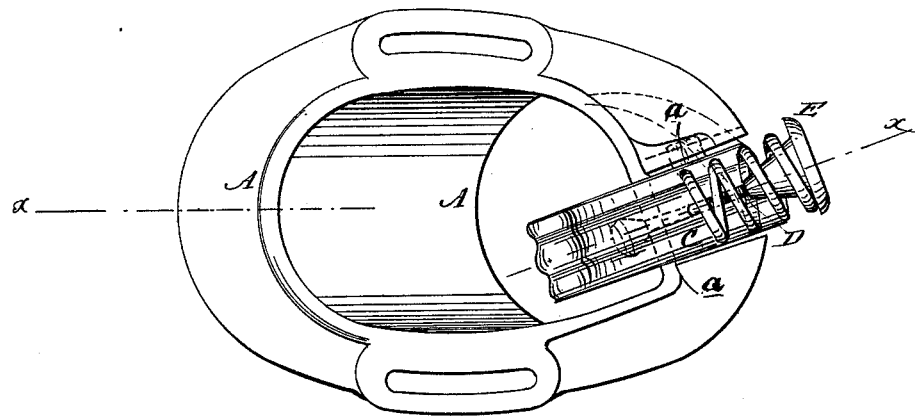
WITNESSES:
C. Neveux
C. Sedgwick
INVENTOR:
W. H. Hall
BY Munn & Co
ATTORNEYS.

UNITED STATES PATENT OFFICE.

WILLIAM H. HALL, OF TIFFIN, OHIO.

IMPROVEMENT IN CORN-SHELLERS.

Specification forming part of Letters Patent No. 203,032, dated April 30, 1878; application filed March 1, 1878.

*To all whom it may concern:*

Be it known that I, WILLIAM H. HALL, of Tiffin, in the county of Seneca and State of Ohio, have invented a new and useful Improvement in Corn-Shellers, of which the following is a specification:

In the accompanying drawings, forming part hereof, Figure 1 is a detail section of the hopper and rub-iron of my improved corn-sheller, taken through the broken line $x\ x$, Fig. 2; and Fig. 2 is a top view of the same.

Similar letters of reference indicate corresponding parts.

The object of this invention is to improve the construction and lessen the cost of the manufacture of corn-shellers, so as to produce a better article at less cost than has heretofore been practicable.

The invention is an improvement upon the hopper described in Patent No. 166,771, granted to myself and C. S. Yingst on the 17th day of August, 1875; and it consists in certain novel features of construction, which will be hereinafter fully described.

Referring to the drawings, A represents the hopper, which is attached to the frame of the machine in the usual way. This hopper is cast or formed with a slotted projecting rim, as shown, extending entirely around its upper edge, except at its rear, where it is cut away to receive and form guiding-jaws $a\ a$ for the rub-iron C. Upon the rear side of the hopper A, and corresponding with the recess, is cast an upwardly-projecting arm, B, upon the upper end of which rests a hook, $c'$, cast or otherwise formed upon the upper end of the rub-iron C.

D is a bolt, which is passed through a hole in the arm B and the rub-iron C, and has a nut, E, screwed upon its outer end. The nut E may be made in the usual way, but I prefer to make it in the shape of a hollow cone with a flange around its edge. As thus formed, the nut E, when screwed up to give greater pressure, covers and serves as a button or guard for the end of the bolt D, and at the same time forms a better support for the end of the coiled spring F, placed upon the bolt D, and the inner end of which rests against the outer side of the rub-iron C. With this construction only one hole is required to be drilled, only one bolt is used, and no rivets are required, the rub-iron being held in its place by the single bolt D and the hook $c'$, and being, therefore, also easily and quickly applied or detached whenever required.

Having thus described my invention, I claim as new and desire to secure by Letters Patent—

1. The rub-iron C, provided with a hook, $c'$, upon its upper end, and arranged outside of the hopper A, in combination with said hopper A, formed with projecting recessed rim and upwardly-projecting arm B, substantially as herein shown and described.

2. The combination of the coiled spring F, and a bolt and nut, with the hooked rub-iron C, arranged outside of hopper A, and the arm B of the hopper A, formed with projecting recessed rim and upwardly-projecting arm B, as herein shown and described.

3. The hollow conical-flanged nut E, in combination with the bolt D, the coiled spring F, the rub-iron C, arranged outside of hopper A, and the upwardly-projecting arm B of the hopper A, substantially as herein shown and described.

WILLIAM HENRY HALL.

Witnesses:
THOMAS H. STARTZMAN,
BENJAMIN G. ATKINS.